(12) United States Patent
Claude et al.

(10) Patent No.: US 10,184,439 B2
(45) Date of Patent: Jan. 22, 2019

(54) METHOD OF DETECTING A CLOGGING OF A FUEL INJECTOR IN AN INTERNAL COMBUSTION ENGINE

(71) Applicant: GM GLOBAL TECHNOLOGY OPERATIONS LLC, Detroit, MI (US)

(72) Inventors: Paul Leonardo Claude, Turin (IT); Serena Tordin, Settimo Torinese (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 103 days.

(21) Appl. No.: 15/366,621

(22) Filed: Dec. 1, 2016

(65) Prior Publication Data

US 2017/0152826 A1    Jun. 1, 2017

(30) Foreign Application Priority Data

Dec. 1, 2015 (GB) .................................. 1521194.9

(51) Int. Cl.
| | | |
|---|---|---|
| G01M 15/05 | (2006.01) | |
| F02M 65/00 | (2006.01) | |
| F02D 41/00 | (2006.01) | |
| F02D 41/14 | (2006.01) | |
| F02D 41/22 | (2006.01) | |

(Continued)

(52) U.S. Cl.
CPC ....... *F02M 65/001* (2013.01); *F02D 41/0087* (2013.01); *F02D 41/1456* (2013.01); *F02D 41/22* (2013.01); *F02D 41/221* (2013.01); *F02D 41/3005* (2013.01); *F01N 3/0814* (2013.01); *F01N 3/106* (2013.01); *F01N 3/2066* (2013.01); *F01N 2560/025* (2013.01); *F02D 41/08* (2013.01); *F02D 2200/0616* (2013.01); *Y02T 10/40* (2013.01)

(58) Field of Classification Search
USPC .............................. 73/114.45, 114.46, 114.48
See application file for complete search history.

(56) References Cited

U.S. PATENT DOCUMENTS

| | | |
|---|---|---|
| 2012/0046845 A1 | 2/2012 | Giovingo |
| 2012/0150417 A1 | 6/2012 | Massaro |

(Continued)

FOREIGN PATENT DOCUMENTS

JP    H04183910 A    6/1992

OTHER PUBLICATIONS

Great Britain Patent Office, Great Britain Search Report for Great Britain Application No. 1521194.9, dated Jan. 19, 2016.

*Primary Examiner* — Eric S McCall
(74) *Attorney, Agent, or Firm* — Lorenz & Kopf, LLP

(57) ABSTRACT

A method and apparatus is disclosed for testing a fuel injector of an internal combustion engine equipped with a plurality of fuel injectors to detect injector clogging. A test injector is switched off. A requested value of a fuel quantity to be injected by the other fuel injectors of the plurality of fuel injectors is adjusted to operate the internal combustion engine in idle mode. A value of an oxygen concentration in an exhaust gas is measured. A value of a fuel quantity that has been injected is estimated as a function of the measured value of the oxygen concentration. A fuel quantity drift of each fuel injector is calculated as a function of the requested values and the estimated values of the fuel quantity provided by the injector tests. Each fuel quantity drift is used to identify if the corresponding fuel injector is clogged.

10 Claims, 2 Drawing Sheets

(51) Int. Cl.
  *F02D 41/30* (2006.01)
  *F01N 3/08* (2006.01)
  *F01N 3/10* (2006.01)
  *F01N 3/20* (2006.01)
  *F02D 41/08* (2006.01)

(56) References Cited

U.S. PATENT DOCUMENTS

| | | | |
|---|---|---|---|
| 2013/0139788 A1* | 6/2013 | Sujan | F02D 41/1495 123/350 |
| 2015/0051814 A1* | 2/2015 | Tordin | F02D 41/2416 701/104 |
| 2017/0107927 A1* | 4/2017 | Tordin | F02D 41/2464 |

* cited by examiner

METHOD OF DETECTING A CLOGGING OF A FUEL INJECTOR IN AN INTERNAL COMBUSTION ENGINE

CROSS-REFERENCE TO RELATED APPLICATION

This application claims priority to Great Britain Patent Application No. 1521194.9, filed Dec. 1, 2015, which is incorporated herein by reference in its entirety.

TECHNICAL FIELD

The present disclosure pertains to a method of detecting a clogging of a fuel injector in an internal combustion engine of a motor vehicle, typically a Diesel engine.

BACKGROUND

It is known that a Diesel engine is generally equipped with an injection system that includes a plurality of electrically controlled fuel injectors for injecting fuel directly into cylinders.

Clogging of a fuel injector, due for example to coking presence, may lead to a degradation of emission performances, engine noise and vibrations. Accordingly, there is a need for a method and system to detect if one or more of the fuel injectors is partially or completely clogged that may be performed, for example at a vehicle service center. Such a method or system would prevent the need to replace all the fuel injectors and eliminate the need to perform a time consuming test using a hydraulic unit fuel injector test bench to detect the clogged fuel injector when connected to the injection system.

SUMMARY

An embodiment of the disclosure provides a method of detecting a clogging of a fuel injector of an internal combustion engine equipped with a plurality of fuel injectors, with each fuel injector of the plurality of fuel injectors being tested as follows. A test injection is switched off. A requested value of a fuel quantity to be injected by the other fuel injectors of the plurality of fuel injectors is adjusted to operate the internal combustion engine in idle mode. A value of an oxygen concentration in an exhaust gas is measured. A value of a fuel quantity that has been injected is estimated as a function of the measured value of the oxygen concentration. A fuel quantity drift of each fuel injector is calculated as a function of the requested values and the estimated values of the fuel quantity provided by each of the injector tests. Each fuel quantity drift is used to identify if the corresponding fuel injector is clogged. As a result, it is possible to detect if one the fuel injectors of an internal combustion engine is clogged or partially clogged, identify the clogged fuel injector independently to the condition of the other fuel injectors and replace only the clogged or partially clogged fuel injector without needing of hydraulic unit fuel injector test benches, reducing therefore the service procedure costs and time. In addition, it is possible to detect the clogging of a fuel injector using a procedure that can be implemented using the electronic control unit of the internal combustion engine and the associated sensors without needing of a connection of the fuel injection system to external hydraulic units.

According to an embodiment, each testing may further include calculating a difference between the product of the requested value of the fuel quantity by a correction factor and the estimated value of the fuel quantity and the fuel quantity drifts of each fuel injector may be calculated as a function of the calculated differences provided by each of the injector tests. This aspect of the present disclosure provides a reliable solution for detecting the clogged or partially clogged fuel injector.

According to an embodiment, the method may further include calculating the correction factor as the ratio between the number of the operated fuel injectors and the number of fuel injectors of the plurality of fuel injectors. As a result, the detection of the clogged or partially clogged fuel injector is more efficient and reliable.

According to a further embodiment, the method may include calculating, for each fuel injector of the plurality of fuel injectors, a drift index based on the corresponding fuel quantity drift, and identifying that a fuel injector is clogged if the corresponding drift index is greater than or equal to a predetermined threshold value. As a result, a precise and accurate detection of each clogged or partially clogged fuel injector may be performed even if more than one fuel injector of the plurality of fuel injectors is contemporaneously clogged or partially clogged.

According to an embodiment, each drift index may be calculated as the ratio between the corresponding fuel quantity drift and a reference value of the fuel quantity to be injected by all the fuel injectors of the plurality of fuel injectors to operate the internal combustion engine in idle mode. In this way, the reference value of the fuel quantity request that has to be injected by all the fuel injectors may be used to parametrize the calculated fuel quantity drifts and to check if the estimation of the fuel quantity values is coherent in order to have more robust detection of the fuel injector clogging.

According to an embodiment, the method may further include operating all the fuel injectors of the plurality of fuel injectors using a reference value of the fuel quantity to be injected by all the fuel injectors of the plurality of fuel injectors to operate the internal combustion engine in idle mode, measuring a value of an oxygen concentration in an exhaust gas, estimating a value of a fuel quantity that has been injected by all the fuel injectors of the plurality of fuel injectors as a function of the measured value of the oxygen concentration, and calculating an overall drift of the fuel quantity injected by all the fuel injectors of the plurality of fuel injectors as the difference between the reference value and the estimated value of fuel quantity due to the operation of all the fuel injectors of the plurality of fuel injectors. As a result, the overall drift of the fuel quantity injected by all the fuel injectors of the plurality of fuel injectors may be used as a reference for the calculated fuel quantity drifts.

By way of an example, in order to check if each of the injector tests are coherent and, therefore, the fuel quantity drifts calculated on the basis of the oxygen concentration measurement in the exhaust gas are rational, the method may further include calculating a sum of each fuel quantity drift, calculating a difference between the calculated sum and the calculated overall drift, and identifying as coherent the testings, if the calculated difference is smaller than or equal to a predetermined threshold value thereof.

The proposed solution, achieving basically the same effects of the method described above, may be carried out with the help of a computer program including a program-code for carrying out, when run on a computer, the method described above, and in the form of a computer program product including the computer program.

Another embodiment of the solution, achieving basically the same effects of the method described above, provides an internal combustion engine equipped with a plurality of fuel injectors and electronic control unit configured for carrying out the method as above disclosed. Again, an embodiment of the solution may provide an automotive system, such as for example a passenger car, equipped with an internal combustion engine as disclosed above.

Another embodiment of the solution, achieving basically the same effects of the method described above, provides an apparatus for detecting a clogging of a fuel injector of an internal combustion engine equipped with a plurality of fuel injectors, wherein the apparatus includes an electronic device, usually referred as scan tool, which is not part of an automotive system and which may be provided to authorized repair technicians for performing diagnostics of the automotive system, configured for carrying out the method as disclosed above.

Another embodiment of the solution provides an apparatus for detecting a clogging of a fuel injector of an internal combustion engine equipped with a plurality of fuel injectors, the apparatus being configured to test each fuel injector of the plurality of fuel injectors by switching off the fuel injector, adjusting a requested value of a fuel quantity to be injected by the other fuel injectors of the plurality of fuel injectors to operate the internal combustion engine in idle mode, measuring a value of an oxygen concentration in an exhaust gas, estimating a value of a fuel quantity that has been injected as a function of the measured value of the oxygen concentration, calculating a fuel quantity drift of each fuel injector as a function of the requested values and the estimated values of the fuel quantity provided by each of the injector tests, and using each fuel quantity drift to identify if the corresponding fuel injector is clogged.

This embodiment achieves basically the same effects of the method described above, particularly that of allowing to detect if one the fuel injectors of an internal combustion engine is clogged or partially clogged, identify the clogged fuel injector independently to the condition of the other fuel injectors and substitute only the clogged or partially clogged fuel injector without needing of hydraulic unit fuel injector test benches, reducing therefore the service procedure costs and time. In addition, it is possible to detect the clogging of a fuel injector using a procedure that can be implemented using the electronic control unit of the internal combustion engine and the associated sensors without needing of a connection of the fuel injection system to external hydraulic units.

According to an embodiment, the apparatus testing may be further configured to calculate a difference between the product of the requested value of the fuel quantity by a correction factor and the estimated value of the fuel quantity and the fuel quantity drifts of each fuel injector by calculating the fuel quantity drift, as a function of the calculated differences provided by all injector tests. This aspect of the present disclosure provides a reliable solution for detecting the clogged or partially clogged fuel injector.

According to an embodiment, the apparatus may be further configured to calculate the correction factor as the ratio between the number of the operated fuel injectors and the number of fuel injectors of the plurality of fuel injectors. As a result, the detection of the clogged or partially clogged fuel injector is more efficient and reliable.

According to a further embodiment, the apparatus may be further configured to calculate, for each fuel injector of the plurality of fuel injectors, a drift index based on the corresponding fuel quantity drift, and identify that a fuel injector is clogged if the corresponding drift index is greater than or equal to a predetermined threshold value. As a result, a precise and accurate detection of each clogged or partially clogged fuel injector may be performed even if more than one fuel injector of the plurality of fuel injectors is contemporaneously clogged or partially clogged.

According to an embodiment, the apparatus may be configured to calculate each drift index as the ratio between the corresponding fuel quantity drift and a reference value of the fuel quantity to be injected by all the fuel injectors of the plurality of fuel injectors to operate the internal combustion engine in idle mode. In this way, the reference value of the fuel quantity request that has to be injected by all the fuel injectors may be used to parametrize the calculated fuel quantity drifts and to check if the estimation of the fuel quantity values is coherent in order to have more robust detection of the fuel injector clogging.

According to an embodiment, the apparatus may further be configured to operate all the fuel injectors of the plurality of fuel injectors using a reference value of the fuel quantity to be injected by all the fuel injectors of the plurality of fuel injectors to operate the internal combustion engine in idle mode, measure a value of an oxygen concentration in an exhaust gas, estimate a value of a fuel quantity that has been injected by all the fuel injectors of the plurality of fuel injectors as a function of the measured value of the oxygen concentration, and calculate an overall drift of the fuel quantity injected by all the fuel injectors of the plurality of fuel injectors as the difference between the reference value and the estimated value of fuel quantity due to the operation of all the fuel injectors of the plurality of fuel injectors. As a result, the overall drift of the fuel quantity injected by all the fuel injectors of the plurality of fuel injectors may be used as a reference for the calculated fuel quantity drifts.

By way of an example, in order to check if the injector tests are coherent and, therefore, the fuel quantity drifts calculated on the basis of the oxygen concentration measurement in the exhaust gas are rational, the apparatus may be configured to calculate a sum of each fuel quantity drift, calculate a difference between the calculated sum and the calculated overall drift, and identify as coherent the injector tests, if the calculated difference is smaller than or equal to a predetermined threshold value thereof.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
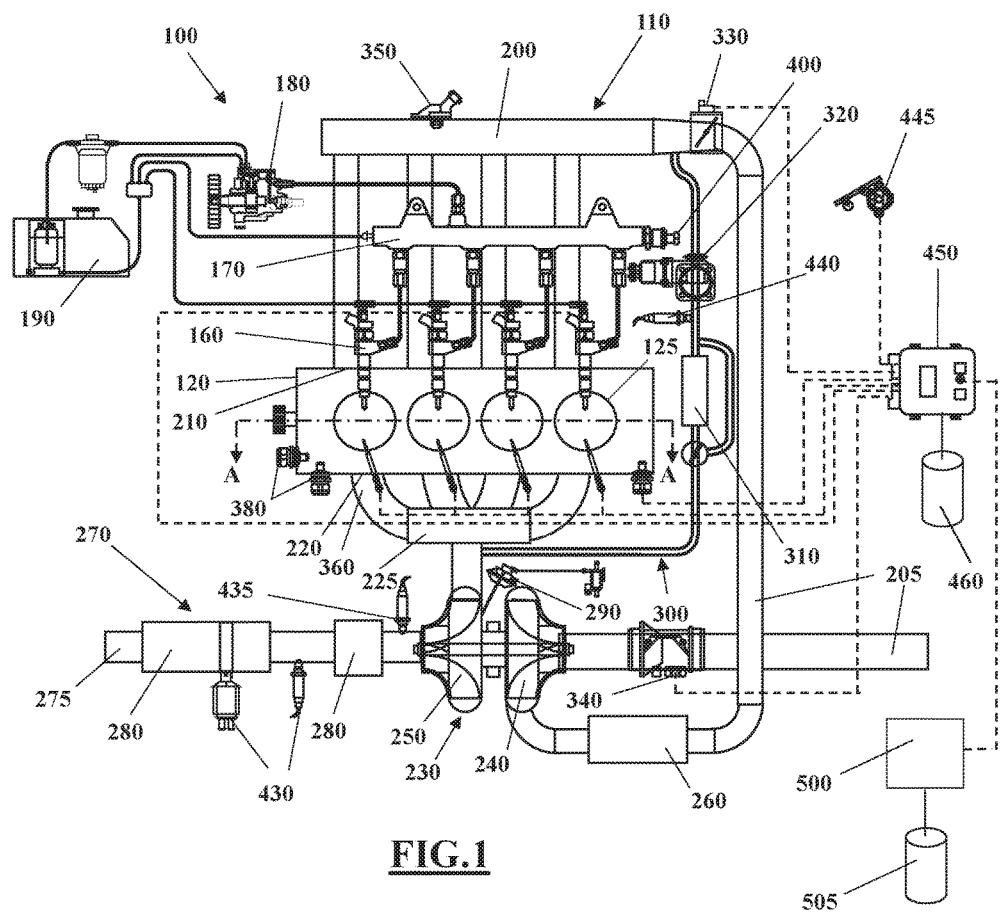
FIG. 1 shows an automotive system.
Figure 2:
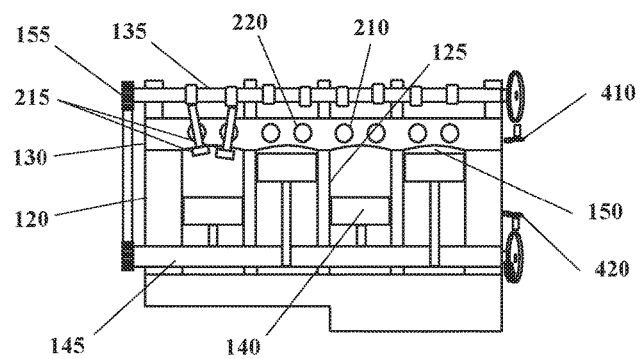
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having a cylinder block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high-pressure fuel pump 180 that increase the pressure of the fuel received from a fuel source 190. The fuel injection system with the above-disclosed components is known as common rail Diesel injection system (CR System). It is a relative new injection system for passenger cars. The main advantage of this injection system, compared to others, is that due to the high pressure in the system and the electromagnetically controlled injectors it is possible to inject the correct amounts of fuel at exactly the right moment. This implies lower fuel consumption and fewer emissions.

Each of the cylinders 125 has at least two valves 215, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle valve 330 may be provided to regulate the flow of air into the intake manifold 200. In still other embodiments, a forced air system such as a turbocharger 230, having a compressor 240 rotationally coupled to a turbine 250, may be provided. Rotation of the compressor 240 increases the pressure and temperature of the air in the air intake duct 205 and intake manifold 200. An intercooler 260 disposed in the air intake duct 205 may reduce the temperature of the air.

The turbine 250 rotates by receiving exhaust gases from an exhaust manifold 225 that directs exhaust gases from the exhaust ports 220 and through a series of vanes prior to expansion through the turbine 250. The exhaust gas exits the turbine 250 and is directed into an exhaust gas aftertreatment system 270. This example shows a variable geometry turbine (VGT) 250 with a VGT actuator 255 arranged to move the vanes to alter the flow of the exhaust gases through the turbine 250.

The exhaust gas aftertreatment system 270 may include an exhaust gas line 275 having one or more exhaust aftertreatment devices 280. The aftertreatment devices 280 may be any device configured to change the composition of the exhaust gases. Some examples of aftertreatment devices 280 include, but are not limited to, catalytic converters (two and three way), oxidation catalysts, for example a Diesel Oxidation Catalyst (DOC), a lean NOx trap (LNT), hydrocarbon adsorbers, a reductant storage device, such as a selective catalytic reduction (SCR) systems or a Selective Catalytic Reduction washcoated particulate filter (SDPF or SCR on DPF) located in the exhaust line 275 downstream of the LNT, and particulate filters, in particular a Diesel Particulate Filter (DPF).

Other embodiments may include an exhaust gas recirculation (EGR) duct 300 coupled between the exhaust manifold 225 and the intake manifold 200. The EGR duct 300 may include an EGR cooler 310 to reduce the temperature of the exhaust gases in the EGR duct 300. An EGR valve 320 regulates a flow of exhaust gases in the EGR duct 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an oxygen sensor 435, for example an Universal Exhaust Gas Oxygen (UEGO) sensor or a lambda sensor or a nitrogen oxides sensor, for measuring an oxygen concentration in the exhaust gas present in the exhaust gas line 275 preferably upstream of the aftertreatment devices 280, an EGR temperature sensor 440, and an accelerator pedal position sensor 445.

Furthermore, the ECU 450 may generate output signals to various control devices that are arranged to control the operation of the ICE 110, including, but not limited to, the fuel injector 160, the throttle valve 330, the EGR Valve 320, the VGT actuator 255, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system 460 and an interface bus. The CPU is configured to execute instructions stored as a program in the memory system, and send and receive signals to/from the interface bus. The memory system may include various storage types including optical storage, magnetic storage, solid-state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulated technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in a motor vehicle.

The ECU 450, or any other substitutive type of processor deployed in the motor vehicle, may be set in communication, via cable or in wireless fashion, with an electronic device 500, usually referred as scan tool, which is not part of the automotive system 100 and which may be provided to authorized repair technicians for performing diagnostics of the automotive system 100. The electronic device 500 may receive input signals from a user interface (e.g. a keyboard), send and receive signals to/from the ECU 450, and display data and/or other information on a visualizer (e.g. a display). To do so, the electronic device 500 may include a digital central processing unit (CPU) in communication with a memory system 505 and an interface bus. The CPU is configured to execute instructions stored as a program in the memory system 505, and send and receive signals to/from the interface bus. The interface bus may be configured to send, receive, and modulate analog and/or digital signals to/from the ECU 450. The memory system 505 may include various storage types including optical storage, magnetic storage, solid-state storage, and other non-volatile memory. The program stored in the memory system 505 is transmitted from outside via a cable or in a wireless fashion. Outside the electronic device 500, the program is normally visible as a computer program product, which should be understood to be a computer program code residing on a carrier, the carrier being transitory or non-transitory in nature with the consequence that the computer program product can be regarded to be transitory or non-transitory in nature, as explained above.

The program stored in the memory system 505 of the electronic device 500 may cooperate with the program stored in the memory system of the ECU 450 to embody the methods that will be disclosed hereafter, allowing the respective CPUs to carryout out the steps of such methods. In other words, some of the steps may be performed by the CPU of the electronic device 500, some other steps may be performed by the CPU of the ECU 450, some other steps may be performed by the CPU of the ECU 450 under instruction of the CPU of the electronic device 500.

Figure 3:
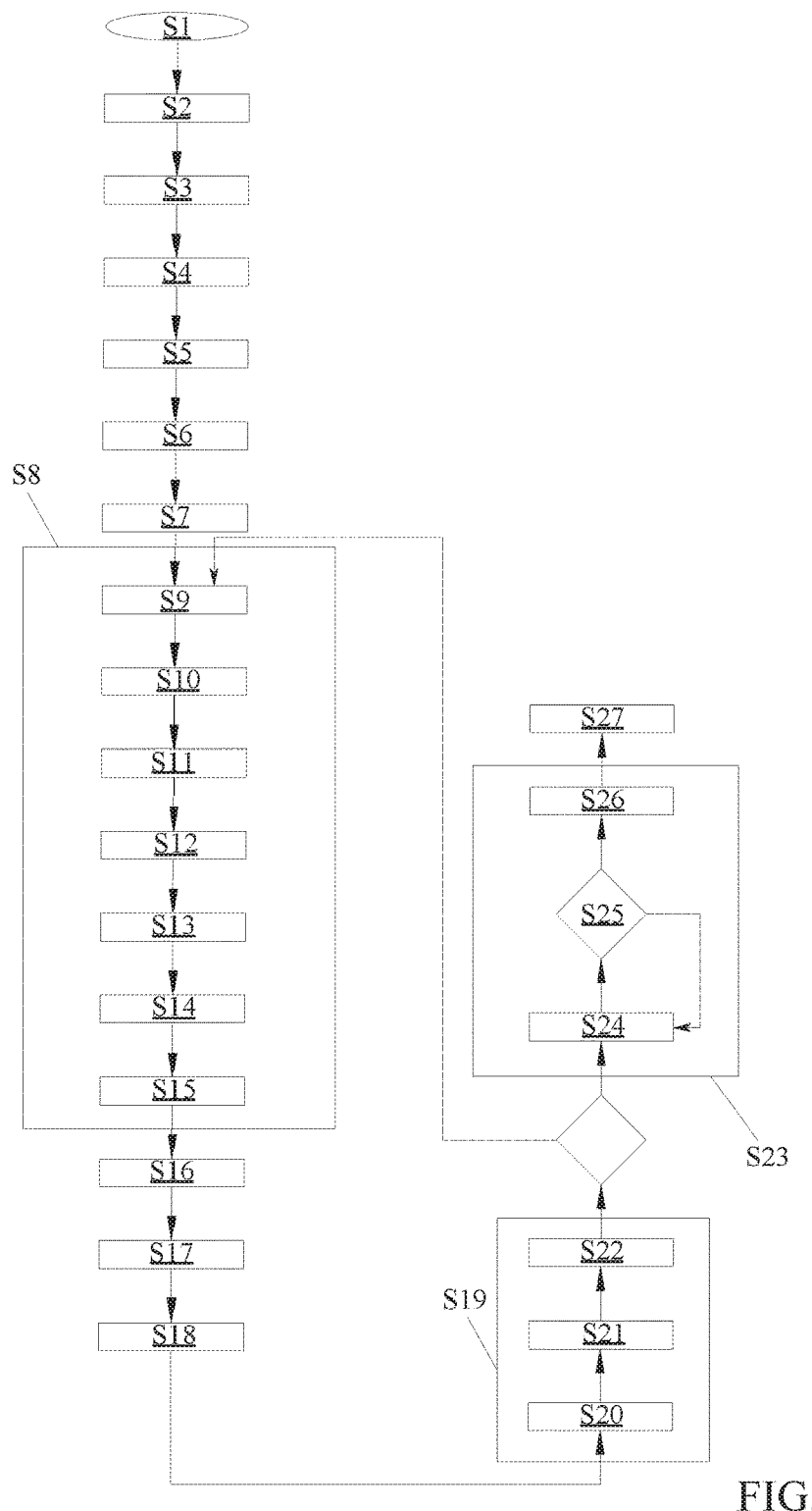
FIG. 3 is a schematic representation of a flowchart of a method of detecting a clogging of a fuel injector.

The method here concerned, shown in the diagram of FIG. 3, is a method of detecting a clogging of at least one fuel injector 160 of a plurality of fuel injectors 160 of the ICE 110, which is intended to be executed in the context of a maintenance service of the motor vehicle, for example a maintenance service caused by the activation of a warning procedure related to a fuel injection system i.e. a common rail Diesel injection system (CR System). While the motor vehicle is standing in parking mode in a predetermined place, for example in a garage, a repair technician may connect the external electronic device 500 to the ECU 450 and start the testing method. The electronic device 500 may be configured to start (block S1) the method upon the reception of a single command that the technician may deliver through the user interface.

Referring to the flowchart of FIG. 3, once the starting command has been received, the electronic device 500 may command the ECU 450 to operate the ICE 110 at idle speed. Idle speed is the rotational speed of the crankshaft 145 (generally measured in revolutions per minute or rpm) that the ICE 110 generates when the ICE 110 is uncoupled to the drivetrain and the accelerator pedal is not depressed. At idle speed, the ICE 110 generates enough power to run reasonably smoothly and to operate its ancillaries (water pump, alternator and other accessories), but usually not enough to move the motor vehicle. For a passenger-car, idle speed is customarily between 600 rpm and 1100 rpm. In order to operate the ICE 110 at idle speed, the ECU 450 may be configured to carry out a closed-loop control of the engine speed, which includes the steps of measuring the rotational speed of the crankshaft 145, for example by the crank position sensor 420, and then of adjusting a requested value of the quantity of fuel that has to be injected into the combustion chambers 150 to minimize a difference between the measured speed and the idle speed.

While the motor vehicle is standing still and the ICE 110 is operating at idle speed, the electronic device 500 may command the ECU 450 to execute a check of the warm-up phase of the ICE 110, in particular the ECU 450 is configured to monitor the temperature of a coolant of a cooling system of the ICE 110 and when the coolant temperature rises up to a target temperature, for example the temperature which causes the opening of a thermostat of the cooling system, the ECU 450 is configured to start the intrusive method of detecting the clogging of the fuel injectors 160.

As a preliminary step, the electronic device 500 may command the ECU 450 to operate (block S2) the high pressure fuel pump 180 in such a way that the pressure into the fuel rail 170 reaches a target pressure predetermined during experimental activities and stored in the memory system 505.

As a first step of the method, the electronic device 500 may command the ECU 450 to operate (block S3) all the fuel injectors 160 to inject, according to a predetermined fuel injection pattern, a requested fuel quantity that guaranties the ICE 110 to run at idle speed. For example, the predetermined fuel injection pattern may be set in order to have a number of injection pulses for each fuel injector 160 predetermined during experimental activities and stored in the memory system 505.

The electronic device 500 may command the ECU 450 to determine (block S4) a reference value $Q_{ref}$ of the requested fuel quantity to be injected by all the fuel injectors 160 which guarantees the ICE 110 to run at idle speed. To do so, the electronic device 500 may command the ECU 450 to check when the ICE 110 reaches a steady state condition. A steady state condition is reached when a variation of the engine speed gets smaller than a predetermined threshold value thereof and a variation of the requested value of the quantity of fuel gets smaller than a predetermined threshold value thereof. Moreover, the predetermined threshold value of the engine speed and the predetermined threshold value of the requested value are values pre-calibrated on dedicated tests performed on a test bench and stored in the memory system 505.

When the ICE 110 reaches the steady state condition, the electronic device 500 may command the ECU 450 to verify that the requested fuel quantity, that guaranties the ICE 110 to run at idle speed, is stable. To do so, by way of an example, the ECU 450 may determine a plurality of values of the requested fuel quantity in a predetermined period of time and, when the difference between a plurality of consecutive pair of determined values (or the gradient) gets lower than a predetermined threshold value thereof, the ECU 450 may identify that the requested fuel quantity is stable.

The predetermined period of time may be predetermined during experiment activities and stored in the memory system 505.

When the requested fuel quantity is identified as stable, the electronic device 500 may command the ECU 450 to calculate the reference value $Q_{ref}$ of the requested fuel quantity calculated as the average of a plurality of determined values of the requested fuel quantity in a predetermined period of time, predetermined during experiment activities and stored in the memory system 505, and to store the reference value $Q_{ref}$ in the memory system 505. In particular, the reference value $Q_{ref}$ is representative of the requested fuel quantity that guaranties the ICE 110 to run at idle speed (in parking mode) when all the fuel injectors 160 of the plurality of fuel injectors 160 are operated.

Again, while the ICE 110 runs at idle speed (in parking mode) and all the fuel injectors 160 of the plurality of fuel injectors 160 are operated, the electronic device 500 may command the ECU 450 to measure (block S5), by the oxygen sensor 435, a value of the oxygen concentration λm in the exhaust gas. Furthermore, the electronic device 500 may command the ECU 450 to determine (block S6) a value of the intake air mass flow $\dot{m}_m$, by way of an example the value of the intake air mass flow $\dot{m}_m$ may be measured by the mass airflow, pressure, temperature sensor 340 or may be estimated on the basis of an engine operating point.

Knowing the value of the oxygen concentration λm and the value of the intake air mass flow $\dot{m}_m$, the electronic device 500 may command the ECU 450 to estimate (block S7) a value $Q_{est\_tot}$ of a fuel quantity that has been actually injected by all the fuel injectors 160 of the plurality of fuel injectors 160 as a function of the measured values of the oxygen concentration and of the intake air mass flow and to store the estimated value $Q_{est\_tot}$ in the memory system 505.

In particular, the estimated value $Q_{est\_tot}$ of the fuel quantity may be calculated with the following formula:

$$Q_{es\_tot}=\dot{m}_m/\lambda_m$$

wherein, $\dot{m}_m$ is the measured (or estimated) value of the intake air mass flow, and λm is the measured value of the oxygen concentration. The estimated value $Q_{est\_tot}$ is representative of the actual fuel quantity that guaranties the ICE 110 to run at idle speed (in parking mode) when all the fuel injectors 160 of the plurality of fuel injectors 160 are operated. The estimated value $Q_{est\_tot}$ stored in the memory system 505 may be calculated as the average of a plurality of estimated values of the fuel quantity estimated in a predetermined period of time, predetermined during experiment activities and stored in the memory system 505.

Once the ECU 450 has operated all the fuel injectors 160 using the reference value $Q_{ref}$ to inject the requested fuel quantity, the electronic device 500 may command the ECU 450 to test (block S8) each fuel injector 160 of the plurality of fuel injectors 160 as disclosed hereinafter. For each fuel injector 160, the test provide for the ECU 450 to switch off (block S9) the tested fuel injector 160 while the other fuel injectors 160 of the plurality of fuel injectors continue to inject the requested fuel quantity into the respective combustion chambers 150.

Once the fuel injector 160 is switched off, the test may provide for the ECU 450 to adjust (block S10), carrying out the closed-loop control of the engine speed as disclosed above, a requested value $Q_{req\_n}$ of the requested fuel quantity to be injected, according to the predetermined fuel injection pattern, by the operated fuel injectors 160, in order to maintain the engine speed equal to idle speed. The test may, therefore, provide for the ECU 450 to check (block S11) when the ICE 110 reaches a steady state condition (with one of the fuel injectors 160 switched off), in which a variation of the engine speed gets smaller than the predetermined threshold value thereof and a variation of the requested value of the quantity of fuel gets smaller than the predetermined threshold value thereof.

When the ICE 110 reaches the steady state condition, the test may provide for the ECU 450 to verify (block S12) that the requested fuel quantity, that guaranties the ICE 110 to run at idle speed with a one of the fuel injectors 160 switched off, is stable. To do so, by way of example, the ECU 450 may determine a plurality of values of the requested fuel quantity in a predetermined period of time and, when the difference between a plurality of consecutive pair of determined values (or the gradient) gets lower than a predetermined threshold value thereof, the ECU 450 may identify that the requested fuel quantity is stable. This predetermined period of time may be predetermined during experimental activities and stored in the memory system 505.

When the requested fuel quantity is identified as stable, the test may provide for the ECU 450 to determine the requested value $Q_{req\_n}$ of the requested fuel quantity calculated as the average of a plurality of determined values of the requested fuel quantity in a predetermined period of time and to store the requested value $Q_{req\_n}$ in the memory system 505. In addition, this predetermined period of time may be predetermined during experiment activities and stored in the memory system 505. In particular, the requested value $Q_{req\_n}$ of each test is representative of the requested fuel quantity that guaranties the ICE 110 to run at idle speed (in parking mode) when the (one) tested fuel injector 160 is switched off and the other fuel injectors 160 are operated.

Again, the test may provide for the ECU 450 to measure (block S13), by the oxygen sensor 435, a value of the oxygen concentration λm in the exhaust gas. Furthermore, the test may provide for the ECU 450 to determine (block S14), as disclosed above, a value of the intake air mass flow $\dot{m}_m$. Knowing the value of the oxygen concentration λm and the value of the intake air mass flow $\dot{m}_m$, the test may provide for the ECU 450 to estimate (block S15) a value $Q_{est\_n}$ of a fuel quantity that has been actually injected by the plurality of operated fuel injectors 160 as a function of the measured values of the oxygen concentration and of the intake air mass flow and to store the estimated value $Q_{est\_n}$ in the memory system 505.

In particular, the estimated value $Q_{est\_n}$ of the fuel quantity may be calculated with the following formula:

$$Q_{es\_tot}=\dot{m}_m/\mu m$$

wherein, $\dot{m}_m$ is the measured (or estimated) value of the intake air mass flow, and λm is the measured value of the oxygen concentration. The estimated value $Q_{est\_n}$ of each test is representative of the actual fuel quantity that guaranties the ICE 110 to run at idle speed (in parking mode) when the tested (one) fuel injector 160 is switched off and the other fuel injectors 160 are operated.

The estimated value $Q_{est\_n}$ stored in the memory system 505 may be calculated as the average of a plurality of estimated values of the fuel quantity estimated in a predetermined period of time. This predetermined period of time may be predetermined during experiment activities and stored in the memory system 505.

Once all the tests (in number equal to the number of the fuel injectors 160) are performed and each requested value $Q_{req\_n}$ and each corresponding estimated value $Q_{est\_n}$ is stored in the memory system 505, the electronic device 500 may command the ECU 450 to calculate (block S16) a fuel quantity drift $\Delta Q_1, \ldots \Delta Q_n$ due to each fuel injector 160 as a function of the requested values $Q_{req\_n}$ and the estimated values $Q_{est\_n}$.

More in detail, the electronic device 500 may command the ECU 450 to calculate (block S17) a difference $\Delta_{tot\_n}$ between the product of the requested value $Q_{req\_n}$ of each test by a correction factor k and the estimated value $Q_{est\_n}$ of the same test. In particular, the electronic device 500 may command the ECU 450 to calculate (block S18) the correction factor K as the ratio between the number (N−1) of the operated fuel injectors 160 at each test and the number (N) of all the fuel injectors 160 of the plurality of fuel injectors 160. The calculated correction factor K may be stored in the memory system 505.

The difference $\Delta_{tot\_n}$ of each test, therefore, may be calculated with the following formula:

$$\Delta_{tot\_n} = K^* Q_{req_n} - Q_{est}$$

Being the difference, $\Delta_{tot\_n}$ of each test the sum of each fuel quantity drift $\Delta Q_1, \ldots \Delta Q_n$ of the injected fuel quantity due to the (N−1) operated fuel injectors 160 of each test, the electronic device 500 may command the ECU 450 to calculate (block S16) each fuel quantity drift $\Delta Q_1, \ldots \Delta Q_n$ as a solution of a linear system of a number of equations equal to the number N of the fuel injectors 160 in a number of variables (namely the fuel quantity drifts $\Delta Q_1, \ldots \Delta Q_n$) equal to the number of the equations, wherein a first term of each equation is expressed as the sum of the fuel quantity drifts $\Delta Q_n$ of the (N−1) operated fuel injectors 160 at each test and a second term of each equation is the corresponding difference $\Delta_{tot\_n}$ of the same test, as above calculated. In practice, the equations of the linear system are the follow:

$$\Delta Q_2 + \Delta Q_3 + \ldots + \Delta Q_n = Q_{ref_1} \times k - Q_{est_1}$$
$$\Delta Q_1 + \Delta Q_3 + \ldots + \Delta Q_n = Q_{ref_2} \times k - Q_{est_2}$$
$$\ldots$$
$$\Delta Q_1 + \Delta Q_2 + \ldots + \Delta Q_{n-1} = Q_{ref_n} \times k - Q_{est_n}$$

wherein, $\Delta Q_1$ is the fuel quantity drift due to the fuel injector 160 switched off at the first performed test, $\Delta Q_2$ is the fuel quantity drift due to the fuel injector 160 switched off at the second performed test, $\Delta Q_3$ is the fuel quantity drift due to the fuel injector 160 switched off at the third performed test, ..., $\Delta Q_{n-1}$ is the fuel quantity drift due to the fuel injector 160 switched off at the n−1$^{th}$ performed test, $\Delta Q_n$ is the fuel quantity drift due to the fuel injector 160 switched off at the n$^{th}$ performed test, $Q_{ref\_1}$ is the reference value of the fuel quantity determined at the first performed test, $Q_{ref\_2}$ is the reference value of the fuel quantity determined at the second performed test, $Q_{ref\_n}$ is the reference value of the fuel quantity determined at the n$^{th}$ performed test, $Q_{est\_1}$ is the estimated value of fuel quantity at the first performed test, $Q_{est\_2}$ is the estimated value of fuel quantity at the second performed test, $Q_{est\_n}$ the estimated value of fuel quantity at the n$^{th}$ performed test and k is the correction factor.

Once each fuel quantity drift $\Delta Q_1, \ldots \Delta Q_n$ is calculated the electronic device 500 may command the ECU 450 to store them in the memory system 505. The electronic device 500 may command the ECU 450 to perform (block S19) a check of the coherence of the above disclosed tests. The coherence check firstly provides for the ECU 450 to calculate (block S20) the sum $S = \Delta Q_1 + \Delta Q_2 + \ldots + \Delta Q_n$ of each calculated fuel quantity drift $\Delta Q_1, \ldots \Delta Q_n$. Again, the coherence check provides for the ECU 450 to calculate (block S21) an overall drift D as the difference between the reference value $Q_{ref\_tot}$ of the fuel quantity and the estimated value $Q_{est\_tot}$ of the fuel quantity due to the operation of all the fuel injectors 160 of the plurality of fuel injectors 160, ($D = Q_{ref\_tot} - Q_{est\_tot}$). Then, the coherence check provides for the ECU 450 to calculate (block S22) the difference V=S−D between the calculated sum S and the overall drift D.

The electronic device 500 may be configured to identify as coherent the performed tests, if the calculated difference V is smaller than or equal to a predetermined threshold value thereof, for example a value pre calibrated by experimental activities and stored in the memory system 505. If the check of the coherence does not yield to a positive result, i.e. the calculated difference V is greater than the threshold value, the electronic device 500 may command the ECU 450 to repeat the tests as disclosed above, disregarding the previously performed tests. If the check of the coherence of the estimation of the estimated values $Q_{est\_n}$ yields a positive result, the electronic device 500 may command the ECU 450 to continue the method as disclosed herein below.

In particular, the electronic device 500 may command the ECU 450 to use (block S23) each calculated fuel quantity drift $\Delta Q_1, \ldots \Delta Q_n$ to identify if the corresponding fuel injector 160 is clogged. In detail, the electronic device 500 may command the ECU 450 to calculate (block S24), for each fuel injector 160, a drift index $DI_1, \ldots DI_n$ on the basis of the corresponding calculated fuel quantity drift $\Delta Q_1, \ldots, \Delta Q_n$. By way of an example, each drift index $DI_1, \ldots DI_n$ may be calculated as the ratio between each corresponding fuel quantity drift $\Delta Q_1, \Delta Q_n$ and the reference value $Q_{ref\_tot}$. In the simplest alternative example, each drift index $DI_1, DI_n$ may coincide with the corresponding fuel quantity drift $\Delta Q_1, \ldots, \Delta Q_n$. Each calculated drift index $DI_1, \ldots DI_n$ may be stored in the memory system 505.

Once the calculated drift index $DI_1, \ldots DI_n$ are stored in the memory system 505, the electronic device 500 may command the ECU 450 to compare (block S25) each calculated drift index $DI_1, \ldots DI_n$ with a predetermined threshold value, for example a critical (percentage) value $DI_c$ pre-calibrated during experimental activities performed on a test hydraulic bench and stored in the memory system 505. The electronic device 500 may then command the ECU 450 to identify (block S26) that one (or more) of the fuel injectors 160 is clogged if the corresponding drift index $DI_1, \ldots DI_n$ is greater than or equal to the predetermined threshold value $DI_c$. In practice, the electronic device 500 may be configured to display (block S27) a test status message on the display reporting the identification (position and/or number) of the at least one fuel injector 160 identified as clogged.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of detecting a clogging of a fuel injector of an internal combustion engine equipped with a plurality of fuel injectors, the method comprising:
   testing each fuel injector of the plurality of fuel injectors, wherein the testing includes:
   switching off a test injector;
   adjusting a requested value of a fuel quantity to be injected by the plurality of fuel injectors excluding the test injector to operate the internal combustion engine in an idle mode;
   measuring a value of an oxygen concentration in an exhaust gas; and
   estimating a value of a fuel quantity that has been injected as a function of the measured value of the oxygen concentration;
   calculating a fuel quantity drift of each test injector as a function of the requested values and the estimated values of the fuel quantity provided by all injector tests; and
   using each fuel quantity drift to identify when the test injector is clogged.

2. The method of claim 1, wherein each testing further comprises calculating a difference between the product of the requested value of the fuel quantity by a correction factor and the estimated value of the fuel quantity, wherein the fuel quantity drift for each test injector is calculated as a function of the calculated differences provided by all injector tests.

3. The method of claim 2, further comprising calculating the correction factor as the ratio between the number of the plurality of fuel injectors excluding the test injector and the number of the plurality of fuel injectors.

4. The method of claim 1, further comprising:
   calculating a drift index on the basis of the corresponding fuel quantity drift for each test injector; and
   identifying a clogged injector when a corresponding drift index for the test injector is greater than or equal to a predetermined threshold value.

5. The method of claim 4, wherein each drift index is calculated as the ratio between the corresponding fuel quantity drift and a reference value of the fuel quantity to be injected by the plurality of fuel injectors to operate the internal combustion engine in idle mode.

6. The method of claim 1, further comprising the steps of:
   operating the plurality of fuel injectors using a reference value of the fuel quantity to be injected thereby to operate the internal combustion engine in the idle mode;
   measuring a value of an oxygen concentration in an exhaust gas;
   estimating a value of a fuel quantity that has been injected by the plurality of fuel injectors as a function of the measured value of the oxygen concentration; and
   calculating an overall drift of the fuel quantity injected by the plurality of fuel injectors as the difference between the reference value and the estimated value of fuel quantity due to the operation of the plurality of fuel injectors.

7. The method of claim 6, further comprising the steps of:
   calculating a sum of each fuel quantity drift;
   calculating a difference between the calculated sum and the calculated overall drift; and
   identifying the injector tests as coherent when the calculated difference is less than or equal to a predetermined threshold value thereof.

8. An internal combustion engine comprising a plurality of fuel injectors and an electronic control unit configured to carry out the method according to claim 1.

9. A non-transitory computer readable medium comprising a program code, which when executed on a computer, is configured to test each fuel injector of a plurality of fuel injectors for detecting a clogged injector of an internal combustion engine, a program code, wherein the testing includes:
   testing each fuel injector of the plurality of fuel injectors, wherein the testing includes:
   switching off a test injector;
   adjusting a requested value of a fuel quantity to be injected by the plurality of fuel injectors excluding the test injector to operate the internal combustion engine in an idle mode;
   measuring a value of an oxygen concentration in an exhaust gas; and
   estimating a value of a fuel quantity that has been injected as a function of the measured value of the oxygen concentration;
   calculating a fuel quantity drift of each test injector as a function of the requested values and the estimated values of the fuel quantity provided by all injector tests; and
   using each fuel quantity drift to identify when the test injector is clogged.

10. A scan tool for detecting a clogged injector of an internal combustion engine, comprising a processor and a non-transitory storage medium having a program code, which when executed on the processor, is configured to test each fuel injector of the plurality of fuel injectors, wherein the testing includes:
    switching off a test injector;
    adjusting a requested value of a fuel quantity to be injected by the plurality of fuel injectors excluding the test injector to operate the internal combustion engine in an idle mode;
    measuring a value of an oxygen concentration in an exhaust gas; and
    estimating a value of a fuel quantity that has been injected as a function of the measured value of the oxygen concentration;
    wherein a fuel quantity drift of each test injector is calculate as a function of the requested values and the estimated values of the fuel quantity provided by all injector tests, and each fuel quantity drift is used to identify when the test injector is clogged.

* * * * *